Nov. 18, 1958     E. W. ROBINSON     2,860,443
ANIMATION ATTACHMENT FOR MINNOW BAIT
Filed May 9, 1955
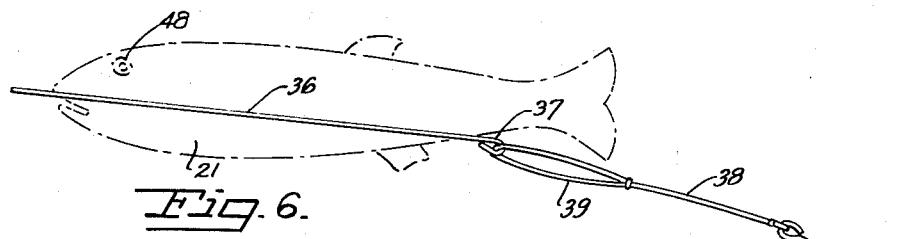
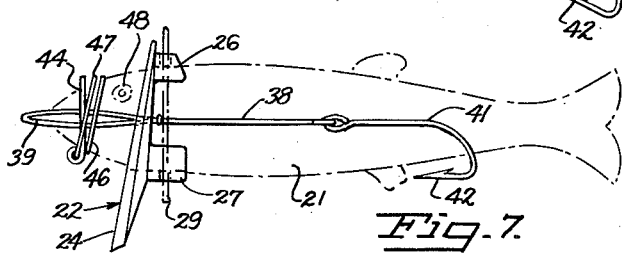
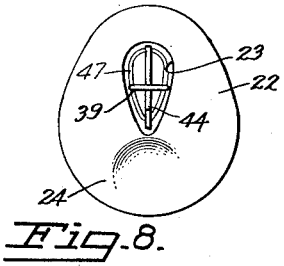
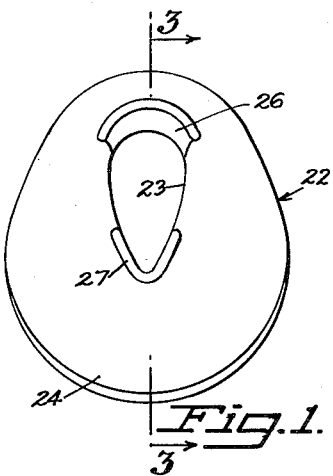
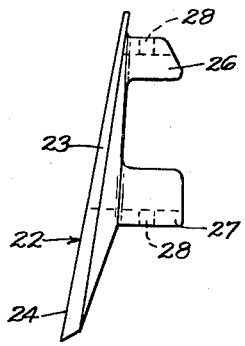
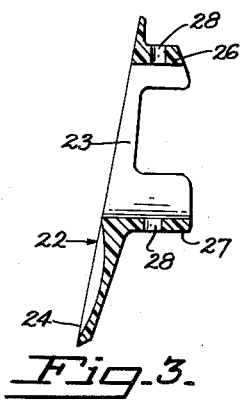
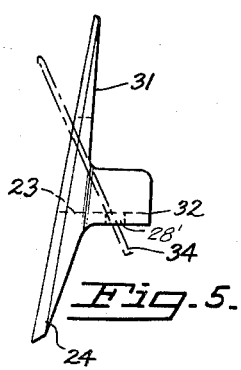
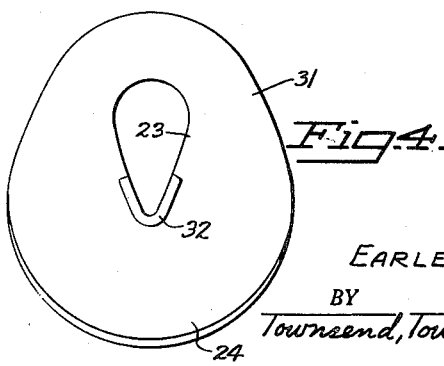
INVENTOR.
EARLE W. ROBINSON
BY
Townsend, Townsend and Hoppe
ATTORNEYS

United States Patent Office 2,860,443
Patented Nov. 18, 1958

2,860,443
ANIMATION ATTACHMENT FOR MINNOW BAIT

Earle W. Robinson, Oakland, Calif.

Application May 9, 1955, Serial No. 506,767

1 Claim. (Cl. 43—44.4)

This invention relates to a new and improved device for attachment to a dead bait, such as a minnow. The device imparts a lifelike animation or action to the bait, which materially improves the fish-getting qualities of the lure while the bait itself maintains the natural appearance of live bait.

One of the features of the invention is the fact that a dead minnow may be securely attached to a fishhook so that when a fish strikes, the bait and hook may be easily separated. Thus, when the fish is hooked, the bait may be stripped from the device and the device may run up and down the line without interfering with the play of the fish or creating a drag or wobble which might otherwise dislodge the hooked fish. The invention is distinguished from other lures of this general type in that despite the fact that the hook and bait are secured together, with the hook concealed interiorly of the bait, nevertheless, the lure receives an animation which is much more effective in luring fish than is the case with other dead bait. In addition, the present invention has the advantage that it is not necessary to keep the bait alive in order to impart the animation which is one of the principal functions of the lure.

Accordingly one of the principal objects and advantages of the present invention is to provide a plate or collar which fits over the head of a minnow and which functions to impart an effective animation to the lure as it is trolled, cast and retrieved, or held stationary in running water.

Another effective feature of the invention is the fact that the eyes of the minnow are positioned in advance of the plate or collar and by reason of their reflective construction, materially enhance the lure effect.

Another feature of the invention is the fact that the position of the plate or collar relative to the minnow may be conveniently adjusted so as to adjust the position and action of the bait as it is acted upon by relative movement of the bait and the water in which the bait is used.

Another feature of the invention is the fact that a special means of attachment of the hook to the minnow is provided and the hook is adequately concealed by the device hereinafter described in detail.

Still another feature of the invention is the fact that the color of the plastic plate or collar which fits over the head of the minnow may be changed, depending upon the condition of the water or other prevailing circumstances or conditions under which the lure is used.

Still another feature of the invention is the fact that other bait, in addition to minnows, may be used, including such substances as bark, cloth, leather, grass, string, feathers, fish fillet, and the like, which may be at hand when other baits are exhausted.

Accordingly the present invention provides a device which makes possible a new method of fishing with dead bait, fish, or any flexible artificial lure material. It provides the advantages of fishing with live bait, yet eliminates the necessity of keeping bait alive.

Other objects of the present invention will become apparent upon reading the following specification and referring to the accompanying drawings in which similar characters of reference represent corresponding parts in each of the several views.

In the drawings:

Fig. 1 is a rear elevation of one form of the plate or collar which is a part of the invention;

Fig. 2 is a side elevation of the structure of Fig. 1;

Fig. 3 is a vertical section taken substantially along the line 3—3 of Fig. 1;

Fig. 4 is a rear elevation of a modified form of the plate or collar;

Fig. 5 is a side elevation of the structure of Fig. 4;

Fig. 6 is a schematic view showing the method whereby a hook used in connection with the invention is inserted in a minnow;

Fig. 7 is a side elevation showing the hook and plate attached to a minnow; and

Fig. 8 is a front elevation of the structure of Fig. 7.

The present invention is designed for use with a minnow 21, but may also be used with such substances as pieces of bark, cloth, leather, grass, string, feathers, fish fillet, or any other flexible material conveniently at hand. An animating plate or collar 22 is provided to fit over a part of the minnow 21, and for such purpose the plate is formed with an aperture 23 having a shape similar in cross-section to the shape of a minnow. Accordingly, the upper edge of the aperture 23 is elliptical and the sides converge downwardly inwardly to a rounded point at the bottom. The plate 22 has an elongated forwardly slanted lower extremity 24 which is dished inwardly and acts as a control fin for the lure. In front elevation, as best shown in Fig. 8, the plate 22 has the shape of a teardrop, so that the force of the water impinging on the front of the plate 22 tends to move the lure and attached bait in simulation of a live minnow.

In order to secure the plate 22 on the minnow 21, the rear surface of the plate is provided with a top flange 26 and a bottom flange 27. The top flange comprises a relatively short member which is arcuate in end elevation, as shown in Fig. 1, and formed with a vertical hole 28. The lower flange 27 is longer than the top flange 26 and forms a V-shape, as likewise best shown in Fig. 1. Flange 27 is also provided with a vertical hole 28 in alignment with the hole 28 in flange 26. The flanges 26 and 27 are so shaped as to fit around the top and bottom, respectively, of the body of the minnow when the plate 22 is in position thereon. In order to hold the minnow in place, a retaining pin 29 is passed through one of the holes 28, then through the body of the minnow and out through the other hole 28, thereby securing the plate in place on the minnow. To facilitate retaining the pin 29 in place, the pin may be made tapered. Thus a conventional toothpick is particularly suitable to function as a retaining pin 29.

As shown in Figs. 4 and 5, a modified form of plate 31 having an aperture 23 similar to that shown in Fig. 1 and a dished lower extremity 24 is provided. A single flange 32 at the bottom of the aperture is provided and the corresponding flange 26 of Fig. 1 is eliminated. In order to hold the device in place, a flexible retaining pin 34 is threaded up through an aperture 28 in flange 32, thence through the body of the minnow and thence out through the front of the plate 31. See Fig. 5.

The plates 22 or 31 may be formed of a plastic material and for such purpose may have incorporated therein a color pigment which is most effective in the particular water in which the lure is used.

One of the features of the invention is the fact that the hook may be securely attached to the bait, so that it is not detached and the bait lost.

In conjunction with the plates 22 or 31 heretofore described, a harness structure may be employed to connect the bait and hook. As shown in Fig. 6, an elongated straight shank threading needle 36 having an eye 37 at its rearward end is threaded through the flesh of a fish near the tail and out through the mouth. A leader 38 having a loop 39 at its forward end is attached to the eye 37 of the needle 36. The rearward end of the leader 38 is connected in conventional fashion to the hook 41. As the needle 36 is withdrawn through the mouth of the minnow 21, the leader 38 is drawn inside the body of the minnow until the point 42 of hook 41 remains outside the body of the minnow 21, but the shank of hook 41 is concealed. Thereupon a pin 44 is passed through the lower jaw of the fish and the loop 39 of the leader 38 and through the body of the fish adjacent the mouth thereof. Pin 44 is attached to a thin wire 46 which is formed in a coil 47 around the forward end of the minnow 21. Accordingly the hook 41 is secured inside the body of the minnow in such manner that it is not readily dislodged. After the hook is in place, the shield 22 is slipped over the forward end of the minnow and secured in place by the retaining pin 29 immediately behind the eyes 48. The line is attached to the loop 39, and needle 36 is removed from the loop.

With the hook 41 thus secured and the shield 22 in place, the minnow 21 may be cast, trolled, or held in place in running water. The relative motion of the water and minnow 21 affects the action of the bait as the water impinges on the shield 22 or 31. The dished lower extremity 24 imparts a side to side wiggle or wobbling movement to the minnow in simulation of live bait and especially in simulation of an injured or wounded live minnow. In connection with the weight distribution, it should be pointed out that the shield 22 is placed immediately behind the eyes 48 so that the luminous, reflective eyes are positioned in advance of the shield 22 where they are most readily observable.

Although the foregoing invention has been described in some detail by way of illustration and example for purposes of clarity of understanding, it is understood that certain changes and modifications may be practiced within the spirit of the invention and scope of the appended claim.

What is claimed is:

An attachment for dead bait comprising an animating plate substantially ovoid in plan, said plate having an aperture proximate its center, said aperture defining an elongate ovoid inverted relative to said plate to conform to and adjustably receive the dead bait, the wider extremity of said plate being dished to provide a control fin, the remainder of said plate being substantially flat, and at least one flange extending rearwardly from a segment of the periphery of said aperture and conforming to the shape of said segment, said flange being formed with a pin-receiving perforation to secure the attachment to a dead bait.

References Cited in the file of this patent

UNITED STATES PATENTS

| | | |
|---|---|---|
| 696,433 | Heddon | Apr. 1, 1902 |
| 1,246,150 | Parr | Nov. 13, 1917 |
| 1,610,204 | Donholt | Dec. 7, 1926 |
| 1,892,892 | Jamar | Jan. 3, 1933 |
| 2,387,255 | Godlewski | Oct. 23, 1945 |
| 2,472,639 | Wickens | June 7, 1949 |
| 2,573,018 | Herrick | Oct. 30, 1951 |

FOREIGN PATENTS

| | | |
|---|---|---|
| 15,284 | Great Britain | 1884 |
| 802,293 | France | 1936 |
| 1,069,262 | France | 1954 |